Dec. 23, 1924.
Re. 15,972
A. TROIANO
RESILIENT HEEL
Original Filed April 16, 1921
Fig. 1.
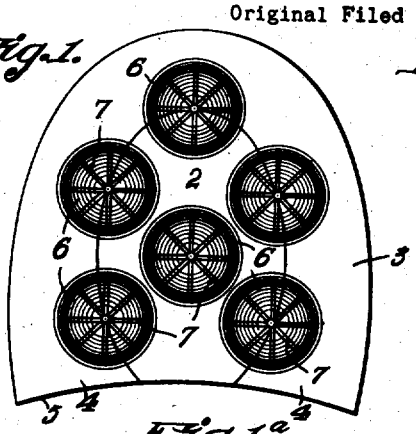
Fig. 2.
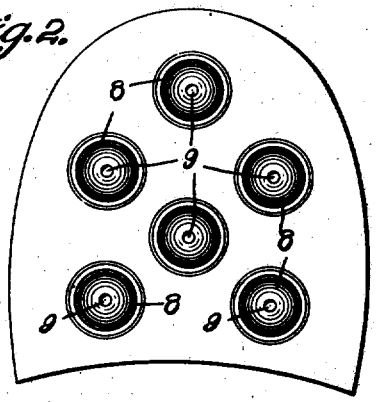
Fig. 1.a
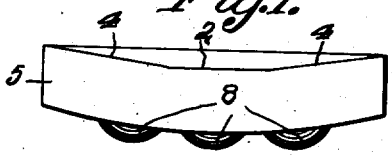
Fig. 3.
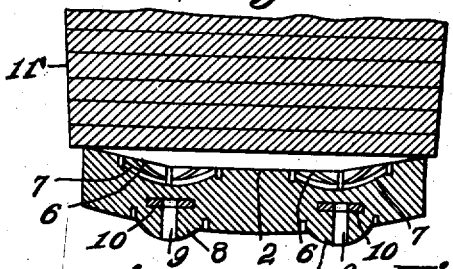
Fig. 4.
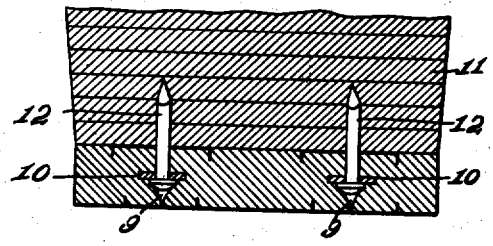
Fig. 5.
Fig. 6.
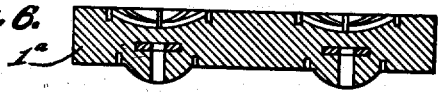
Fig. 7.
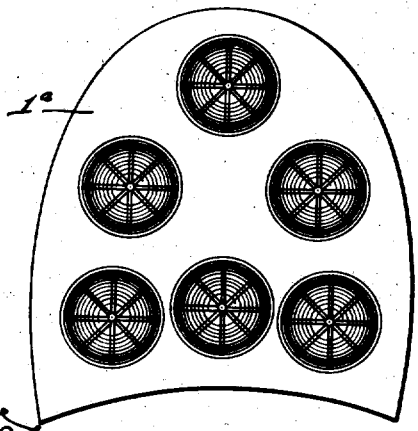
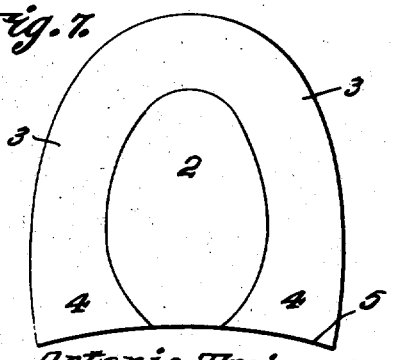
Antonio Troiano
INVENTOR
BY Victor J. Evans
ATTORNEY
Lindsay
Thomas E. Turpin
WITNESSES Reissued Dec. 23, 1924. Re. 15,972

UNITED STATES PATENT OFFICE.

ANTONIO TROIANO, OF WASHINGTON, DISTRICT OF COLUMBIA.

RESILIENT HEEL.

Original No. 1,409,070, dated March 7, 1922, Serial No. 461,811, filed April 16, 1921. Application for reissue filed February 1, 1923. Serial No. 616,374.

*To all whom it may concern:*

Be it known that I, ANTONIO TROIANO, a citizen of the United States, residing at Washington, in the District of Columbia, have invented new and useful improvements in Resilient Heels, of which the following is a specification.

The object of my present invention is the provision of a resilient heel of such construction that the nail holes in the heel will be automatically closed after the driving of the attaching nails so as to exclude from within the heel dust, dirt and the like; the said construction also being of such character as to contribute to the neat fit of the resilient heel to the leather heel lifts.

To the attainment of the foregoing, the invention consists in the improvement as hereinafter described and definitely claimed.

In the accompanying drawings, forming part of this specification:—

Figure 1 is a top plan view showing a resilient heel made in accordance with my invention.

Figure 1ª is a front edge elevation of the same.

Figure 2 is an inverted plan view of the said heel.

Figure 3 is a view showing the resilient heel in cross-section as properly arranged relatively to a leather heel and precedent to the attachment of the resilient heel to the leather heel.

Figure 4 is a similar view showing the resilient heel attached to the leather heel lifts.

Figures 5 and 6 are views of a straight or flat resilient heel constructed in accordance with my invention.

Figure 7 is a top plan view of another modified resilient heel constructed in accordance with my invention.

Singular numerals designate corresponding parts in Figures 1 to 4 to which reference will first be made.

At its upper side my novel resilient heel is characterized by a central portion 2, and a marginal incline 3, the said incline 3 being made comparatively long and more gradual at its forward ends 4, Figures 1 and 1ª so that when the resilient heel is pressed against the underside of a heel lift the upper forward corner 5 of the resilient heel will be crowded or fitted tightly against the underside of the heel lift with a view to averting the entrance of dust between the resilient heel and the opposed leather lift. It will also be understood by comparison of Figures 1 and 3 that the upper side of the resilient heel 1 is generally concave, and is provided with a plurality of recesses 6 in the bottoms of which are narrow radical grooves 7. At the underside of the resilient heel 1 which underside is generally convex are provided protuberances 8. The said proturbances 8 are coincident with the recesses 6, Figures 2, 3 and 4, and it will also be noted that the protuberances 8 are of less diameter than the recesses 8. Extending upwardly from the undersides of the protuberances 8 and centrally thereof are nail holes 9 which are coincident with apertures in metallic reinforcing or anchor plates 10 that are embedded in the heel 1.

In applying my novel resilient heel to a leather heel indicated by 11, nails 12 are driven through the apertures 9 to the position shown in Figure 4, with the result that the protuberances 8 will be contracted and the outer ends of the apertures 9 will be closed so as to effectively prevent the entrance of dust, dirt and grit into the heel, and so that after application the underside of the resilient heel will be practically imperforate and therefore calculated to last longer than those resilient heels that are apertured at their undersides. It will be understood in this connection that the nailing of the resilient heel 1 to the leather heel 11 will be attended by the straightening of the resilient heel as shown in Figure 4 so that the edges of the resilient heel and leather heel will be flush and a finished job produced. It will also be understood that when the recesses 6 are crowded against the underside of the leather heel 11 the said recesses 6 will give rise to a suction action which will have the effect of holding the resilient heel snug against the underside of the leather heel 11 with the result that the resilient heel will be retained in the straight state as shown in Figure 4 more perfectly than would be the case were the nails 12 alone depended upon to perform such function. At this time the proturbances 8, according to the size thereof, will either be flush with the under surface of the heel or else will project but a slight distance from said surface.

As clearly shown in Figures 1 and 2, the centers of the outer recesses 6 and consequently the outer protuberance nail-holes 9, coincident with said centers, intersect or register with the division line between the central depressed portion 2 and the marginal incline 3 at the upper side of the heel. This relative arrangement is practically advantageous inasmuch as it assures the tight opposition of the upper side of the resilient heel to the underside of a leather heel lift when the protuberances are flattened out by the driving home of nails through the protuberances, and in that way contributes to the neat fit of the resilient heel to the leather heel lifts.

The nail holes of the protuberances arranged in a U-shaped series, are disposed in coincidence with the U-shaped line between the portions 2 and 3 at the upper side of the heel. Because of this relative arrangement free flattening and tight fit of the upper side of the resilient heel against a leather lift is assured as is also free flattening of the protuberances and closure of the holes at the underside of the resilient heel when the nails are driven home as appears in Figure 4.

The resilient heel $1^a$ as shown in Figures 5 and 6 is similar to the construction shown in Figures 1 to 4 with the exception that the resilient heel $1^a$ is a straight or flat heel having normally straight or flat lower and upper sides.

In Figure 7, I illustrate the upper side of a concavo-convex resilient heel $1^b$ which lacks the protuberances 8 and recesses 6, but is provided at its upper side with a central portion 2, a marginal inclined portion 3 and comparatively long and more gradual inclinations 4 at the forward ends of the inclination 3, so that when the said heel is applied to a leather heel the upper forward corner 5 thereof will be enabled to tightly fit throughout its length against the leather heel with a view to effectively excluding dust and dirt from between the resilient heel and the leather heel.

Notwithstanding the advantages and features hereinbefore ascribed to my novel resilient heel, it will be manifest that the heel is susceptible of being inexpensively produced when made in large quantities.

Having described my invention, what I claim and desire to secure by Letters Patent, is:—

1. A resilient heel having recesses in its upper side and coincident protuberances at its underside and also having nail holes extending upwardly through the protuberances and so constructed and arranged that when the protuberances are flattened by the driving home of nails the said holes will be closed.

2. A resilient heel convex at its underside and characterized at its upper side by a central substantially-flat and depressed portion and a U-shaped marginal incline, whereby said upper side is hollow throughout its area and said hollow is open throughout the length of the forward end of the heel; said heel having at its underside spaced protuberances arranged in a U-shaped series and also having nail holes extending upwardly through the centers of the spaced protuberances and so constructed and arranged that when the protuberances are flattened by the driving home of nails the said holes will be closed, said nail holes being in coincidence with the line between said central substantially-flat and depressed portion and said U-shaped marginal incline.

3. A resilient heel convex at its underside and characterized at its upper side by a central substantially-flat and depressed portion and a U-shaped marginal incline, whereby said upper side is hollow throughout its area and said hollow is open throughout the length of the forward end of the heel; said heel having at its underside spaced protuberances arrange in a U-shaped series and also having nail holes extending upwardly through the centers of the spaced protuberances and so constructed and arranged that when the protuberances are flattened by the driving home of nails the said holes will be closed, said nail holes being in coincidence with the line between said central substantially-flat and depressed portion and said U-shaped marginal incline; and said heel also having in its upper side recesses coincident with the protuberances at the underside of the heel.

4. A resilient heel convexed at its underside and having at its upper side a central substantially flat and depressed portion and a U-shaped marginal incline, whereby said upper side is hollow throughout its area and said hollow is open throughout the length of the forward end of the heel; said heel also having at its underside spaced protuberances arrange in a U-shaped series and nail holes in said protuberances and arranged in coincidence with the line between said central substantially flat and depressed portion and said U-shaped marginal incline.

In testimony whereof I affix my signature.

ANTONIO TROIANO. [L. S.]